United States Patent
Koshikawa

(10) Patent No.: US 11,866,579 B2
(45) Date of Patent: Jan. 9, 2024

(54) CURABLE FLUOROPOLYETHER-BASED RUBBER COMPOSITION AND OPTICAL COMPONENT

(71) Applicant: SHIN-ETSU CHEMICAL CO., LTD., Tokyo (JP)

(72) Inventor: Hidenori Koshikawa, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 318 days.

(21) Appl. No.: 17/293,421

(22) PCT Filed: Oct. 24, 2019

(86) PCT No.: PCT/JP2019/041600
§ 371 (c)(1),
(2) Date: May 12, 2021

(87) PCT Pub. No.: WO2020/100544
PCT Pub. Date: May 22, 2020

(65) Prior Publication Data
US 2021/0403709 A1 Dec. 30, 2021

(30) Foreign Application Priority Data
Nov. 14, 2018 (JP) .................................. 2018-213679

(51) Int. Cl.
*C08L 71/00* (2006.01)
*G02B 1/04* (2006.01)

(52) U.S. Cl.
CPC .......... *C08L 71/00* (2013.01); *C08L 2201/10* (2013.01); *G02B 1/04* (2013.01)

(58) Field of Classification Search
CPC ........ C08L 71/00; C08L 2201/10; G02B 1/04
USPC ........................................................ 524/401
See application file for complete search history.

(56) References Cited

U.S. PATENT DOCUMENTS

| | | | |
|---|---|---|---|
| 5,656,711 A | 8/1997 | Fukuda et al. | |
| 2002/0061969 A1* | 5/2002 | Shiono ................. | C08G 65/007 525/100 |
| 2011/0237732 A1 | 9/2011 | Matsuda et al. | |
| 2011/0257315 A1 | 10/2011 | Shiono et al. | |
| 2013/0082300 A1 | 4/2013 | Koshikawa et al. | |

FOREIGN PATENT DOCUMENTS

| | | |
|---|---|---|
| JP | 2990646 B2 | 12/1999 |
| JP | 3239717 B2 | 12/2001 |
| JP | 3562578 B2 | 9/2004 |
| JP | 2007-12637 A | 1/2007 |
| JP | 2010-202857 A | 9/2010 |
| JP | 5246190 B2 | 7/2013 |
| JP | 2014-5328 A | 1/2014 |
| JP | 5459033 B2 | 4/2014 |
| JP | 5653877 B2 | 1/2015 |
| JP | 5735457 B2 | 6/2015 |
| JP | 5956391 B2 | 7/2016 |
| JP | 2016-216679 A | 12/2016 |
| JP | 6329866 B2 | 5/2018 |

OTHER PUBLICATIONS

International Search Report for PCT/JP2019/041600 (PCT/ISA/210) dated Dec. 17, 2019.
Written Opinion of the International Searching Authority for PCT/JP2019/041600 (PCT/ISA/237) dated Dec. 17, 2019.
Extended European Search Report for European Application No. 19883933.4, dated Jul. 13, 2022.

* cited by examiner

*Primary Examiner* — Hui H Chin
(74) *Attorney, Agent, or Firm* — Birch, Stewart, Kolasch & Birch, LLP

(57) ABSTRACT

Provided are: a curable fluoropolyether-based rubber composition from which a cured product having good light transmissivity and excellent rubber strength is produced; and an optical component having a cured product layer of said composition.

The curable fluoropolyether-based rubber composition contains:

(A) a linear polyfluoro compound having at least two alkenyl groups in one molecule and a perfluoropolyether structure in a main chain;

(B) a fluorine-containing organohydrogen siloxane which has at least two hydrogen atoms directly bonded to a silicon atom (SiH group) and has a monovalent perfluoroalkyl group or a monovalent perfluorooxyalkyl group or a divalent perfluoroalkylene group or a divalent perfluorooxyalkylene group in one molecule;

(C) sodium fluoride; and (D) a platinum group metal-based catalyst in an amount of 0.1-2,000 ppm in terms of the mass of a platinum group metal atom with respect to component (A).

6 Claims, No Drawings

CURABLE FLUOROPOLYETHER-BASED RUBBER COMPOSITION AND OPTICAL COMPONENT

TECHNICAL FIELD

This invention relates to a curable fluoropolyether-based rubber composition and an optical part comprising a cured product layer of the composition.

BACKGROUND ART

Fluorinated curable compositions are known in the prior art. Patent Document 1 (JP 2990646) discloses a composition comprising a linear fluoropolyether compound containing at least two alkenyl groups per molecule and having a perfluoropolyether structure in its main chain, a fluorinated organohydrogensiloxane having at least two silicon-bonded hydrogen atoms per molecule, and a platinum group metal compound. The composition cures into a cured product having a good profile of heat resistance, chemical resistance, solvent resistance, mold release, water repellency, oil repellency, and low-temperature properties.

Patent Document 2 (JP 5246190) proposes a composition comprising a tailored linear fluoropolyether compound, the composition curing into a cured product having higher acid resistance than the cured product of the composition of Patent Document 1.

Further, Patent Document 3 (JP 3239717) and Patent Document 4 (JP 5459033) propose compositions which are endowed with self-adhesion to metal and plastic substrates by adding an organopolysiloxane having hydrosilyl groups (SiH groups) and epoxy and/or trialkoxysilyl groups to the foregoing compositions.

Patent Document 5 (JP 3562578) discloses a composition which is improved in adhesion by adding an organosiloxane having cyclic carboxylic anhydride residue to the aforementioned composition having self-adhesion.

Meanwhile, it is proposed to use a composition belonging to the self-adhesive compositions and capable of providing a cured product having satisfactory light transmittance as optical parts. For example, Patent Document 6 (JP 5653877) describes to use the composition as a material for encapsulating photo-semiconductor chips. Patent Document 7 (JP 5956391) describes to use the composition as a surface layer material of a fixing member for use in an imaging device having a light reflecting sensor mounted thereon.

The cured products of these compositions, however, lack rubber strength and are liable to troubles such as frequent occurrence of cracks by external impacts. It is thus desired to improve rubber strength.

To address the problem, Patent Document 8 (JP 5735457) proposes to add spherical silica particles having an average particle size of 0.050 to 10 μm. In this case, impact resistance is improved, but there arises an inconvenience that the light transmission of a cured product is drastically reduced.

PRIOR ART DOCUMENTS

Patent Documents

Patent Document 1: JP 2990646
Patent Document 2: JP 5246190
Patent Document 3: JP 3239717
Patent Document 4: JP 5459033
Patent Document 5: JP 3562578
Patent Document 6: JP 5653877
Patent Document 7: JP 5956391
Patent Document 8: JP 5735457

SUMMARY OF INVENTION

Technical Problem

An object of the invention, which has been made under the above-mentioned circumstances, is to provide a curable fluoropolyether-based rubber composition capable of providing a cured product having satisfactory light transmission and improved rubber strength, and an optical part having a cured product layer of the composition.

Solution to Problem

Making extensive investigations to attain the above object, the inventor has found that when a composition comprising specific components to be described below is combined with sodium fluoride as a component for improving rubber strength without substantially affecting light transmission, there is obtained a curable fluoropolyether-based rubber composition capable of providing a cured product having satisfactory light transmission and improved rubber strength. The invention is predicated on this finding.

Accordingly, the invention provides a curable fluoropolyether-based rubber composition and an optical part having a cured product layer of the composition as defined below.

[1]

A curable fluoropolyether-based rubber composition comprising:

(A) a linear polyfluoro compound containing at least two alkenyl groups per molecule and having a perfluoropolyether structure in its main chain, (B) a fluorine-containing organohydrogensiloxane having a monovalent perfluoroalkyl or monovalent perfluorooxyalkyl group or a divalent perfluoroalkylene or divalent perfluorooxyalkylene group and containing at least two silicon-bonded hydrogen atoms (or SiH groups), per molecule, in an amount to give 0.2 to 3 moles of SiH groups in component (B) per mole of alkenyl groups in component (A), (C) sodium fluoride in an amount of 0.10 to 100 parts by weight per 100 parts by weight of component (A), and (D) a platinum group metal-based catalyst in an amount to give 0.1 to 2,000 ppm of platinum group metal atom based on the weight of component (A).

[2]

The curable fluoropolyether-based rubber composition of [1] wherein the linear polyfluoro compound as component (A) has an alkenyl content of 0.005 to 0.3 mol/100 g.

[3]

The curable fluoropolyether-based rubber composition of [1] or [2] wherein the perfluoropolyether structure in component (A) contains a structure having the general formula (1):

$$—(C_aF_{2a}O)_b—\qquad(1)$$

wherein a is an integer of 1 to 6 and b is an integer of 1 to 300.

[4]
The curable fluoropolyether-based rubber composition of any one of [1] to [3] wherein component (A) is a linear polyfluoro compound having the general formula (2):

[Chem. 1]

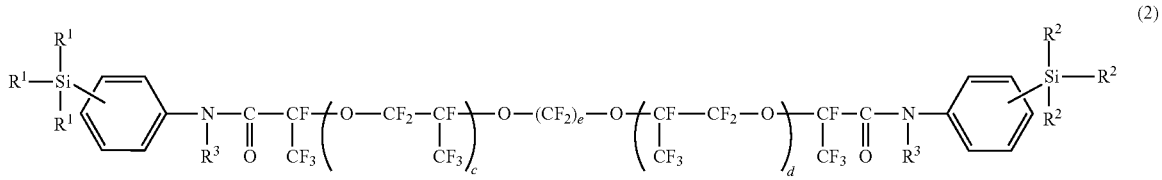

wherein $R^1$ and $R^2$ each are an alkenyl group or an unsubstituted or substituted monovalent hydrocarbon group free of aliphatic unsaturation, $R^1$ is independent each other, $R^2$ is independent each other, at least two of the total six $R^1$ and $R^2$ are alkenyl groups, $R^3$ is each independently hydrogen or an unsubstituted or substituted monovalent hydrocarbon group, c and d each are an integer of 1 to 150, an average value of c+d is 2 to 300, and e is an integer of 1 to 6, and/or a linear polyfluoro compound having the general formula (3):

[Chem. 2]

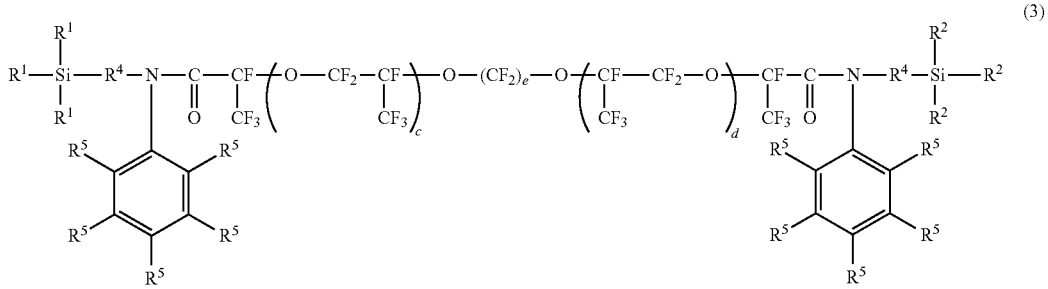

wherein $R^1$ and $R^2$ each are an alkenyl group or an unsubstituted or substituted monovalent hydrocarbon group free of aliphatic unsaturation, $R^1$ is independent each other, $R^2$ is independent each other, at least two of the total six $R^1$ and $R^2$ are alkenyl groups, $R^4$ is each independently a $C_1$-$C_6$ alkylene group, $R^5$ is each independently hydrogen or a $C_1$-$C_4$ alkyl group which may be substituted with fluorine, c and d each are an integer of 1 to 150, an average value of c+d is 2 to 300, and e is an integer of 1 to 6.

[5] The curable fluoropolyether-based rubber composition of any one of [1] to [4] which provides a cured rubber product having a total transmittance of at least 80% as measured at thickness 2 mm according to JIS K7361-1.

[6]
An optical part comprising a cured product layer of the curable fluoropolyether-based rubber composition of any one of [1] to [5].

Advantageous Effects of Invention

According to the invention, there are provided a curable fluoropolyether-based rubber composition capable of providing a cured product having satisfactory light transmission and improved rubber strength, and an optical part having a cured product layer of the composition.

DESCRIPTION OF EMBODIMENTS

Now the invention is described in detail.
<Curable Fluoropolyether-Based Rubber Composition>
The invention provides a curable fluoropolyether-based rubber composition comprising components (A) to (D) as defined below.

[Component (A)]
Component (A) is a linear polyfluoro compound containing at least two alkenyl groups per molecule and having a perfluoropolyether structure in its main chain.

The alkenyl groups in component (A) are preferably those groups of 2 to 8 carbon atoms, more preferably 2 to 6 carbon atoms, terminated with $CH_2=CH-$ structure, for example, vinyl, allyl, propenyl, isopropenyl, butenyl, and hexenyl, most preferably vinyl and allyl.

The linear polyfluoro compound as component (A) should preferably have an alkenyl content of 0.005 to 0.3 mol/100 g, more preferably 0.007 to 0.2 mol/100 g. As long as the alkenyl content is not less than 0.005 mol/100 g, the risk that the inventive composition is under-cured due to an insufficient degree of crosslinking is eliminated. As long as the alkenyl content is not more than 0.3 mol/100 g, the risk that the cured rubber product resulting from curing of the inventive composition is degraded in mechanical properties is eliminated.

The perfluoropolyether structure that component (A) possesses contains a plurality of repeating units having the formula:

$$—C_aF_{2a}O—$$

wherein a is an integer of 1 to 6. One exemplary structure has the general formula (1):

—(C$_a$F$_{2a}$O)$_b$— (1)

wherein a is an integer of 1 to 6, and b is an integer of 1 to 300, preferably 1 to 200.

Examples of the repeating unit having formula: —C$_a$F$_{2a}$O— include:

—CF$_2$O—,

—CF$_2$CF$_2$O—,

—CF$_2$CF$_2$CF$_2$O—,

—CF(CF$_3$)CF$_2$O—,

—CF$_2$CF$_2$CF$_2$CF$_2$O—,

—CF$_2$CF$_2$CF$_2$CF$_2$CF$_2$CF$_2$O—, and

—C(CF$_3$)$_2$O—.

Of these, repeating units of

—CF$_2$O—,

—CF$_2$CF$_2$O—,

—CF$_2$CF$_2$CF$_2$O—, and

—CF(CF$_3$)CF$_2$O— are preferred.

Notably, the perfluoropolyether structure that component (A) possesses may be composed of repeating units of one type or of two or more types.

Preferred examples of component (A) include linear polyfluoro compounds having the general formulae (2) and (3).

[Chem. 3]

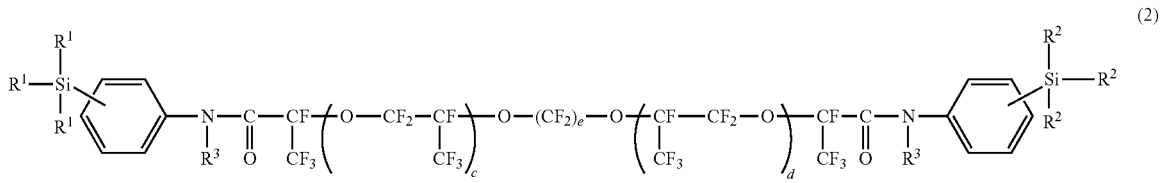

(2)

In formula (2), R$^1$ and R$^2$ each are an alkenyl group or an unsubstituted or substituted monovalent hydrocarbon group free of aliphatic unsaturation, R$^1$ is independent each other, R$^2$ is independent each other, at least two of the total six R$^1$ and R$^2$ are alkenyl groups, R$^3$ is each independently hydrogen or an unsubstituted or substituted monovalent hydrocarbon group, c and d each are an integer of 1 to 150, an average value of c+d is 2 to 300, and e is an integer of 1 to 6.

[Chem. 4]

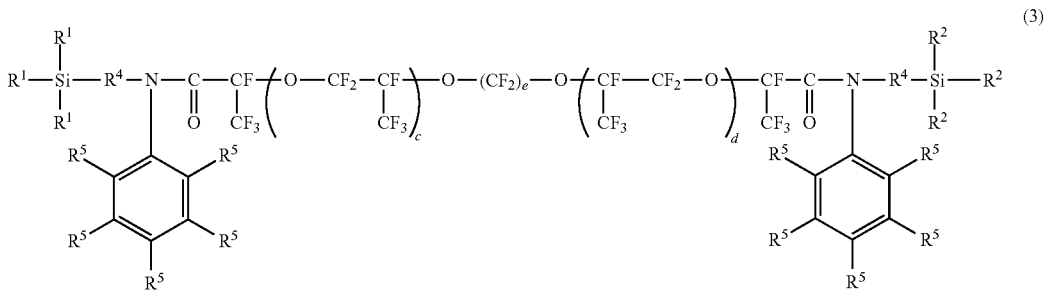

(3)

In formula (3), R$^1$ and R$^2$ each are an alkenyl group or an unsubstituted or substituted monovalent hydrocarbon group free of aliphatic unsaturation, R$^1$ is independent each other, R$^2$ is independent each other, at least two of the total six R$^1$ and R$^2$ are alkenyl groups, R$^4$ is each independently a C$_1$-C$_6$ alkylene group, R$^5$ is each independently hydrogen or a C$_1$-C$_4$ alkyl group which may be substituted with fluorine, c and d each are an integer of 1 to 150, an average value of c+d is 2 to 300, and e is an integer of 1 to 6.

Of the groups represented by R$^1$ and R$^2$, examples of the alkenyl group are as exemplified above for the alkenyl group in component (A). The unsubstituted or substituted, aliphatic unsaturation-free monovalent hydrocarbon group, other than the alkenyl group, is preferably of 1 to 12 carbon atoms, more preferably of 1 to 10 carbon atoms. Examples thereof include alkyl groups such as methyl, ethyl, propyl, butyl, hexyl, cyclohexyl, and octyl, aryl groups such as phenyl and tolyl, and aralkyl groups such as benzyl and phenylethyl, as well as substituted forms of the foregoing monovalent hydrocarbon groups in which some or all of the hydrogen atoms are substituted by halogen atoms such as fluorine. Inter alia, $R^1$ and $R^2$ are preferably vinyl, allyl, methyl and ethyl.

Of the groups represented by $R^3$, examples of the unsubstituted or substituted monovalent hydrocarbon group are as exemplified above for the unsubstituted or substituted, aliphatic unsaturation-free monovalent hydrocarbon groups $R^1$ and $R^2$. $R^3$ is preferably hydrogen, methyl or ethyl.

$R^4$ is a $C_1$-$C_6$, preferably $C_2$-$C_6$ alkylene group, examples of which include methylene, ethylene, propylene (trimethylene or methylethylene), butylene (tetramethylene or methylpropylene), and hexamethylene, with ethylene and propylene being most preferred.

$R^5$ is each independently hydrogen or a $C_1$-$C_4$ alkyl group which may be substituted with fluorine. Examples of the optionally fluorinated $C_1$-$C_4$ alkyl group include alkyl groups such as methyl, ethyl, propyl and butyl, and substituted forms of the foregoing groups in which some or all of the hydrogen atoms are substituted by fluorine, such as trifluoromethyl. Of these, hydrogen is preferred.

The subscripts c and d each are preferably an integer of 1 to 150, more preferably 1 to 100, an average value of c+d is preferably 2 to 300, more preferably 2 to 200, and e is preferably an integer of 1 to 6, more preferably 1 to 4.

Examples of the linear polyfluoro compound having the general formula (2) include those of the following formulae. Herein Me stands for methyl, and Et for ethyl.

[Chem. 5]

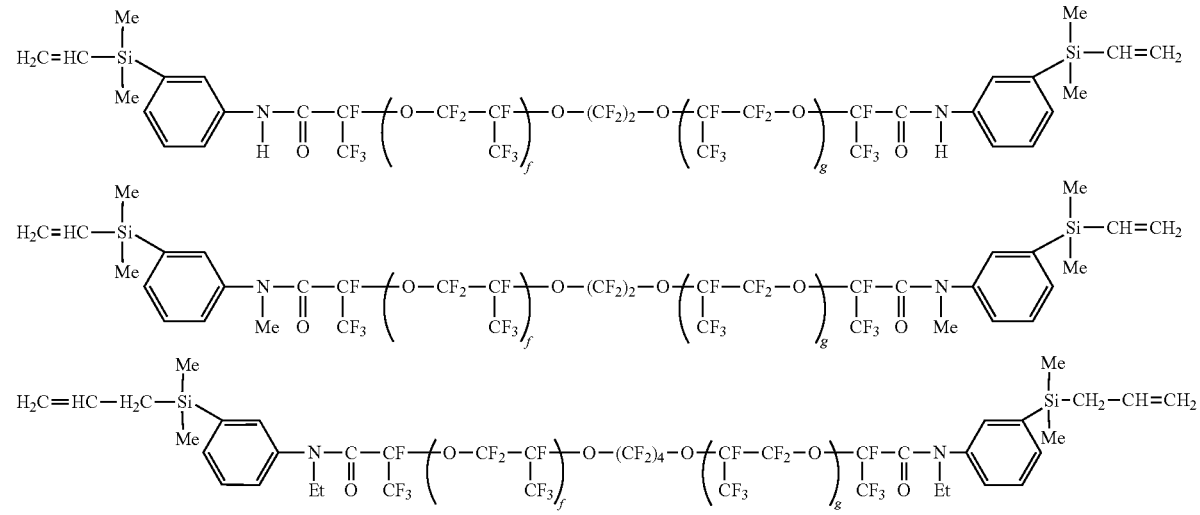

Herein f and g each are an integer of 1 to 150.

[Chem. 6]

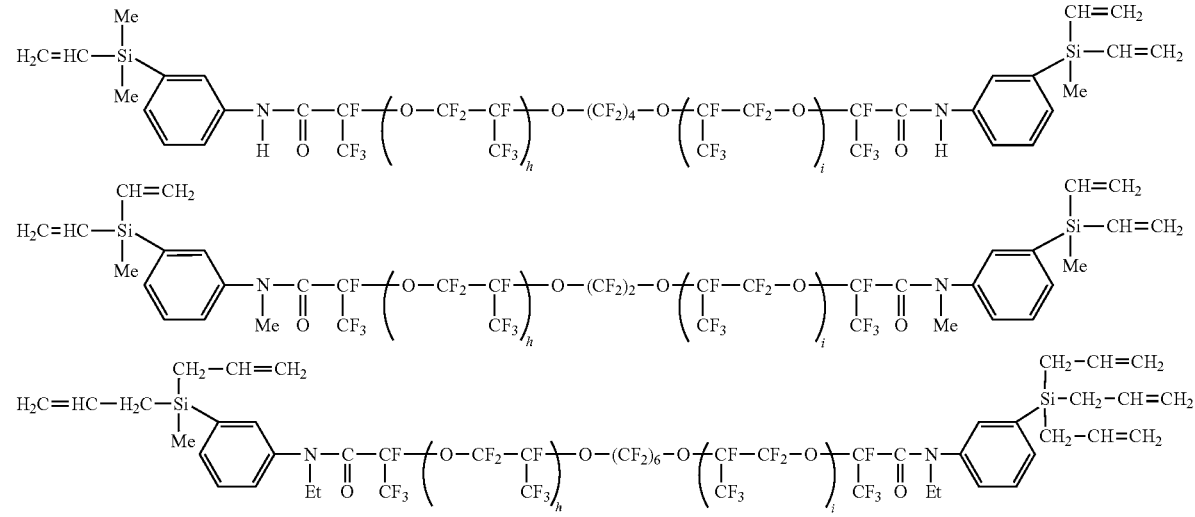

Herein h and i each are an integer of 1 to 150.

[Chem. 7]
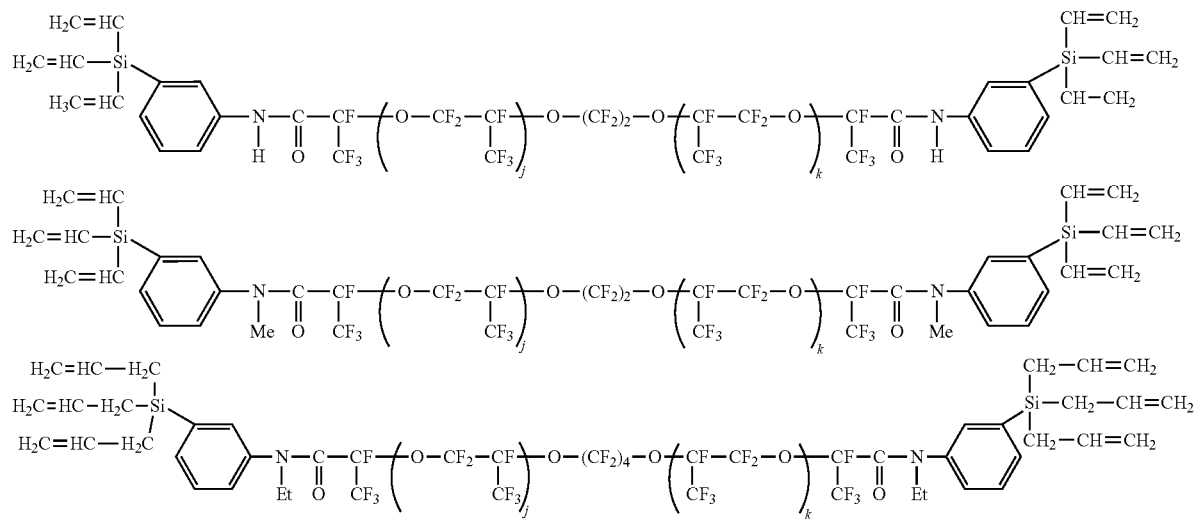
Herein j and k each are an integer of 1 to 150.
Examples of the linear polyfluoro compound having the general formula (3) include those of the following formulae.
[Chem. 8]
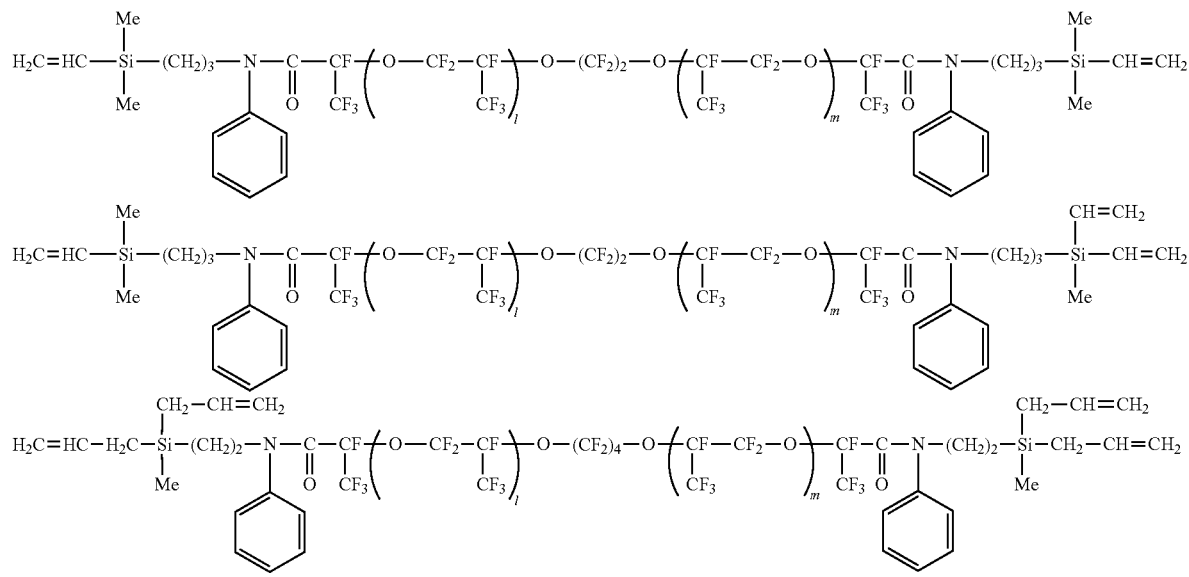
Herein l and m each are an integer of 1 to 150.
[Chem. 9]
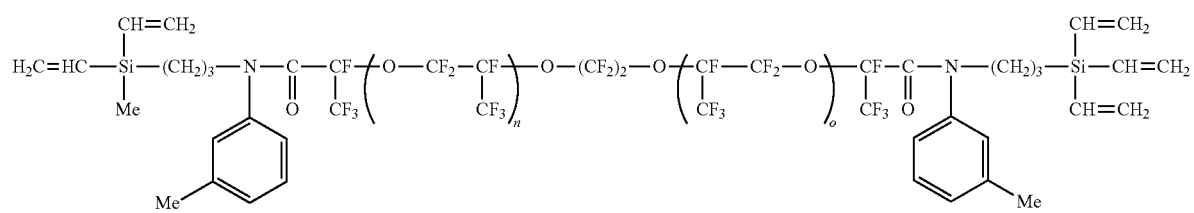

-continued

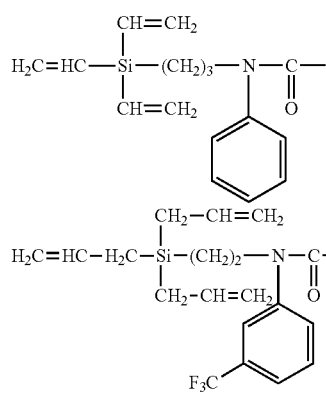
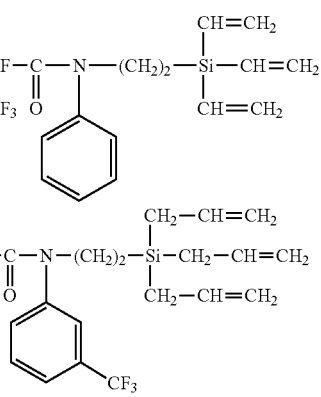

Herein n and o each are an integer of 1 to 150.

It is noted that the viscosity is herein measured by a rotational viscometer, e.g., viscometer of BL, BH, BS or cone plate type, or rheometer. The linear polyfluoro compound having the general formula (2) or (3) preferably has a viscosity at 23° C. of 500 to 100,000 mPa·s, more preferably 1,000 to 50,000 mPa·s, as measured according to JIS K7117-1. As long as the viscosity is 500 mPa·s or higher, there is no risk that the inventive composition loses shelf stability. As long as the viscosity is 100,000 mPa·s or lower, there is no risk that the resulting rubber composition degrades in extensibility.

The degree of polymerization (or molecular weight) of the linear polyfluoro compound that reflects the number of repeating perfluorooxyalkylene units of which the main chain perfluoropolyether structure is composed may be determined, for example, as a number average degree of polymerization (or number average molecular weight) by gel permeation chromatography (GPC) versus polystyrene standards using a fluorochemical solvent as eluent.

The linear polyfluoro compound may be used alone or in a combination of two or more. Specifically, each of the linear polyfluoro compounds having the general formulae (2) and (3) may be used alone or in a combination of two or more while it is also acceptable to use a combination of linear polyfluoro compounds having the general formulae (2) and (3).

[Component (B)]

Component (B) is a fluorine-containing organohydrogensiloxane having a monovalent perfluoroalkyl or monovalent perfluorooxyalkyl group or a divalent perfluoroalkylene or divalent perfluorooxyalkylene group and containing at least two silicon-bonded hydrogen atoms, i.e., hydrosilyl groups (SiH groups), per molecule. It functions as a crosslinker for component (A).

The monovalent perfluoroalkyl group, monovalent perfluorooxyalkyl group, divalent perfluoroalkylene group or divalent perfluorooxyalkylene group is introduced in view of compatibility with or dispersion in component (A) and uniformity after cure.

Typical of the monovalent perfluoroalkyl or monovalent perfluorooxyalkyl group are groups having the general formulae (4) and (5).

$$C_pF_{2p+1}— \quad (4)$$

Herein p is an integer of 1 to 10, preferably 3 to 7.

[Chem. 10]

$$F(\overset{CF_3}{\underset{|}{C}}FCF_2O)_q\overset{CF_3}{\underset{|}{C}}F— \quad (5)$$

Herein q is an integer of 1 to 50, preferably 2 to 30.

Typical of the divalent perfluoroalkylene or divalent perfluorooxyalkylene group are groups having the general formulae (6) to (8).

$$—C_rF_{2r}— \quad (6)$$

Herein r is an integer of 1 to 20, preferably 2 to 10.

[Chem. 11]

$$—\overset{CF_3}{\underset{|}{C}}F—(OCF_2CF)_s—O—CF_2CF_2—O—(CFCF_2O)_t—\overset{CF_3}{\underset{|}{C}}F— \quad (7)$$

Herein s and t each are an integer of at least 1, preferably 1 to 100, and an average value of s+t is 2 to 200, preferably 2 to 100.

$$—CF_2O—(CF_2CF_2O)_u(CF_2O)_v—CF_2— \quad (8)$$

Herein u and v each are an integer of 1 to 50, preferably 1 to 30, and an average value of u+v is 2 to 100, preferably 2 to 80. Individual repeating units may be randomly arranged.

The perfluoroalkyl, perfluorooxyalkyl, perfluoroalkylene or perfluorooxyalkylene group is preferably linked to a silicon atom in the siloxane via a divalent linking group. The divalent linking group is preferably an unsubstituted or substituted divalent hydrocarbon group of 2 to 13 carbon atoms, preferably 2 to 8 carbon atoms which may contain an oxygen, nitrogen or silicon atom. Exemplary are alkylene groups, arylene groups, mixtures thereof, and such groups which are separated by at least one structure selected from the group consisting of an ether bond oxygen atom, amide bond, carbonyl bond, ester bond, and diorganosilylene groups such as dimethylsilylene. Suitable linking groups are those groups of 2 to 13 carbon atoms including:

—CH$_2$CH$_2$—,

—CH$_2$CH$_2$CH$_2$—,

—CH$_2$CH$_2$CH$_2$OCH$_2$—,

—CH$_2$CH$_2$CH$_2$—NH—CO—,

—CH$_2$CH$_2$CH$_2$—N(Ph)—CO—,

—CH$_2$CH$_2$CH$_2$—N(CH$_3$)—CO—,

—CH$_2$CH$_2$CH$_2$—N(CH$_2$CH$_3$)—CO—,

—CH$_2$CH$_2$CH$_2$—N(CH(CH$_3$)$_2$)—CO—,

—CH$_2$CH$_2$CH$_2$—O—CO—,

—CH$_2$CH$_2$—Si(CH$_3$)$_2$-Ph'-N(CH$_3$)—CO—, and

—CH$_2$CH$_2$CH$_2$—Si(CH$_3$)$_2$-Ph'-N(CH$_3$)—CO— wherein Ph is phenyl, and Ph' is phenylene.

Besides the mono- or divalent fluorinated organic group and silicon-bonded hydrogen atom, the fluorinated organohydrogensiloxane as component (B) contains silicon-bonded monovalent substituent groups, which are unsubstituted or substituted, C$_1$-C$_{20}$, preferably C$_1$-C$_{12}$ alkyl groups or aryl groups, for example, alkyl groups such as methyl, ethyl, propyl, butyl, hexyl, cyclohexyl, octyl and decyl, aryl groups such as phenyl, tolyl and naphthyl, and substituted forms of the foregoing groups in which some or all of the hydrogen atoms are substituted by halogen (e.g., chlorine), cyano or the like, such as chloromethyl, chloropropyl and cyanoethyl. Of these, methyl is preferred.

The fluorinated organohydrogensiloxane as component (B) may have a cyclic, chain-like or three-dimensional network structure or a combination thereof. The number of silicon atoms in the fluorinated organohydrogensiloxane is typically about 2 to 60, preferably about 3 to 30, more preferably about 4 to 30, though not critical.

Also, component (B) which contains at least two SiH groups per molecule has a SiH content of preferably 0.0001 to 0.02 mol/g, more preferably 0.0002 to 0.01 mol/g.

Typical of component (B) are compounds having the following general formulae (9) to (15).

[Chem. 12]

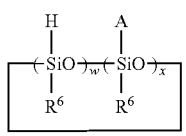

(9)

In formula (9), A is each independently a monovalent perfluoroalkyl or monovalent perfluorooxyalkyl group (as defined above) bonded to a silicon atom in the siloxane via a divalent hydrocarbon group which may contain an oxygen, nitrogen or silicon atom. Typical of the monovalent perfluoroalkyl or monovalent perfluorooxyalkyl group are groups of the above formulae (4) and (5). R$^6$ is independently an unsubstituted or substituted, C$_1$-C$_{20}$, preferably C$_1$-C$_{12}$ alkyl group or aryl group (as defined above). The subscript w is an integer of 2 to 6, preferably 3 to 6, x is an integer of 1 to 4, preferably 1 to 3, and w+x is an integer of 4 to 10, preferably 4 to 9. Notably, the order of arrangement of —(Si(H)(R$^6$)O)— and —(Si(A)(R$^6$)O)— is not limited.

[Chem. 13]

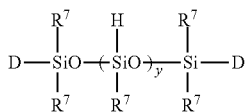

(10)

In formula (10), D is each independently the same as A, R$^7$ is each independently the same as R$^6$, and y is an integer of 2 to 50, preferably 3 to 30.

[Chem. 14]

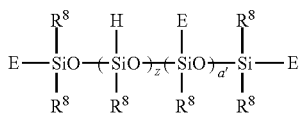

(11)

In formula (11), E is each independently the same as A, and R$^8$ is each independently the same as R$^6$. The subscript z is an integer of 2 to 50, preferably 3 to 30, a' is an integer of 1 to 40, preferably 1 to 20, and z+a' is an integer of 4 to 60, preferably 4 to 50. Notably, the order of arrangement of —(Si(H)(R$^8$)O)— and —(Si(E)(R$^8$)O)— is not limited.

[Chem. 15]

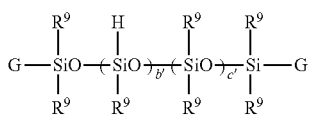

(12)

In formula (12), G is each independently the same as A, and R$^9$ is each independently the same as R$^6$. The subscript b' is an integer of 2 to 50, preferably 3 to 30, c' is an integer of 1 to 40, preferably 1 to 20, and b'+c' is an integer of 4 to 60, preferably 4 to 50. Notably, the order of arrangement of —(Si(H)(R$^9$)O)— and —(Si(R$^9$)$_2$O)— is not limited.

[Chem. 16]

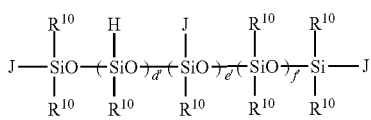

(13)

In formula (13), J is each independently the same as A, and R$^{10}$ is each independently the same as R$^6$. The subscript d' is an integer of 2 to 50, preferably 3 to 30, e' is an integer of 1 to 40, preferably 1 to 20, f' is an integer of 1 to 40, preferably 1 to 20, and d'+e'+f is an integer of 5 to 60, preferably 5 to 50. Notably, the order of arrangement of —(Si(H)(R$^{10}$)O)—, —(Si(J)(R$^{10}$)O)— and —(Si(R$^{10}$)$_2$O)— is not limited.

[Chem. 17]

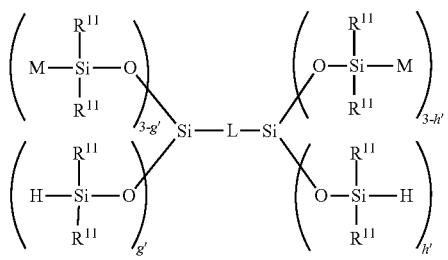

(14)

In formula (14), L is an oxygen atom, an alkylene group, or a divalent perfluoroalkylene or divalent perfluorooxyalkylene group bonded to the adjacent silicon atom via a divalent hydrocarbon group which may contain an oxygen or nitrogen atom. Examples of the divalent perfluoroalkylene or divalent perfluorooxyalkylene group include those having the general formulae (6) to (8). M is each independently the same as A, and $R^{11}$ is each independently the same as $R^6$. The subscript g' is 0 or an integer of 1 to 3, to h' is 0 or an integer of 1 to 3, and g'+h' is an integer of 2 to 6, preferably 3 to 5.

[Chem. 18]

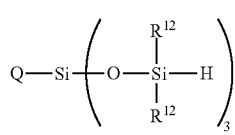

(15)

In formula (15), Q is the same as A, and $R^{12}$ is each independently the same as $R^6$.

The following compounds are exemplary of component (B). These compounds may be used alone or in admixture of two or more. In the following formulae, Me stands for methyl and Ph for phenyl.

[Chem. 19]

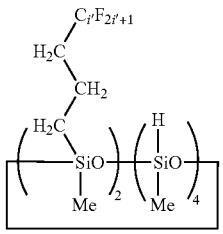

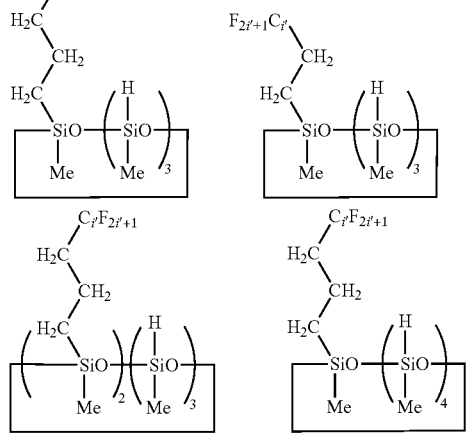

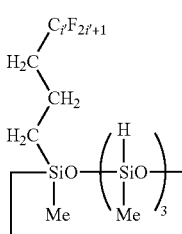

Herein i' is an integer of 1 to 10.

[Chem. 20]

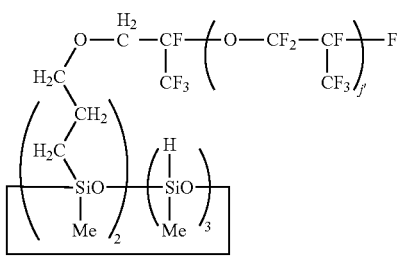

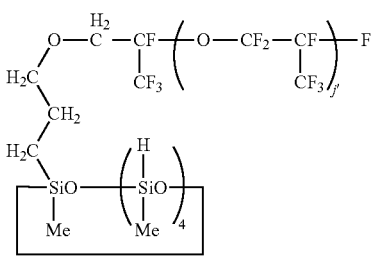

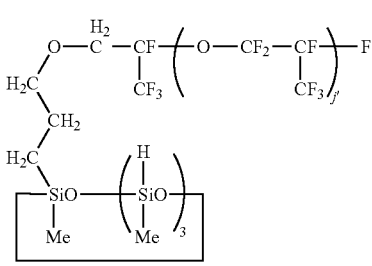

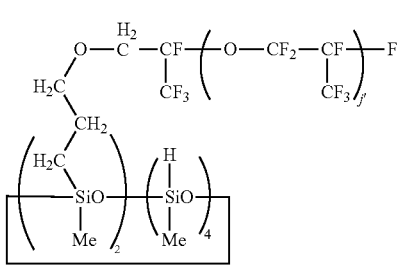

Herein j' is an integer of 1 to 50.

[Chem. 21]
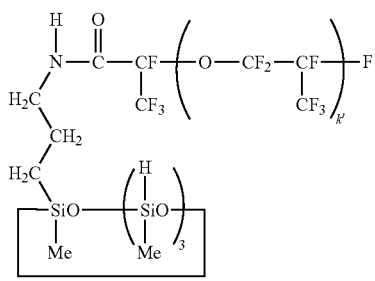
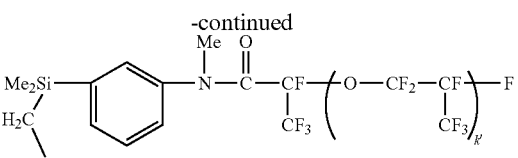
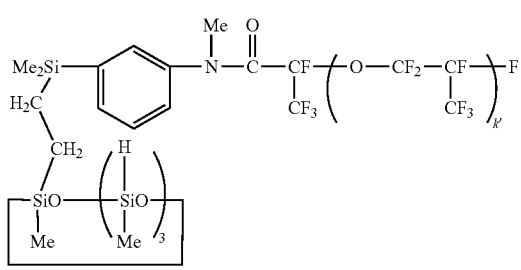
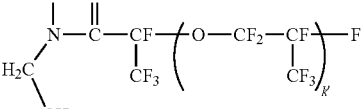
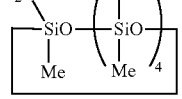
Herein k' is an integer of 1 to 50.
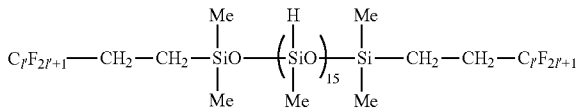
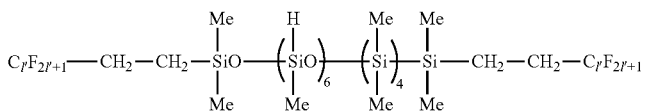
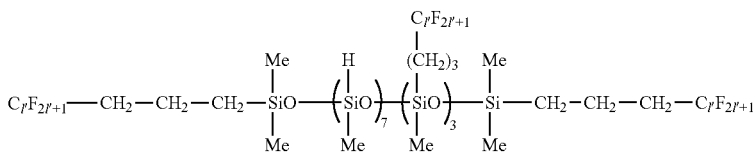
Herein l' is an integer of 1 to 10.
[Chem. 23]
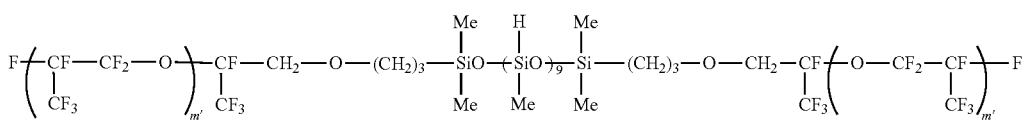
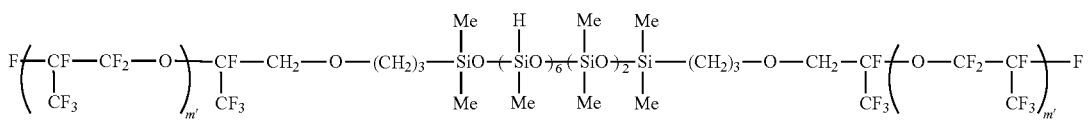
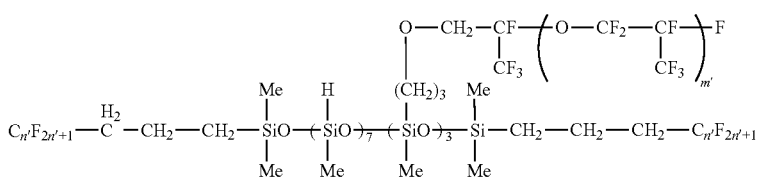

-continued
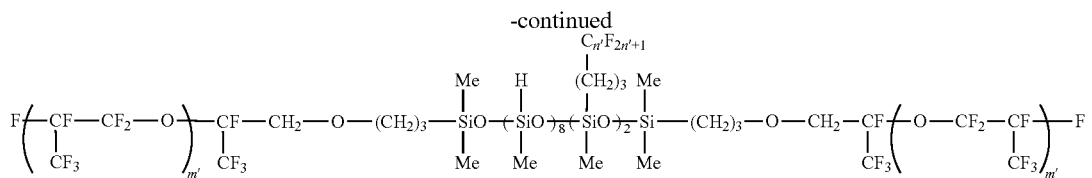
Herein m' is an integer of 1 to 50 and n' is an integer of 1 to 10.
[Chem. 24]
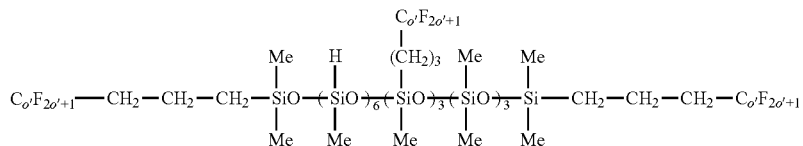
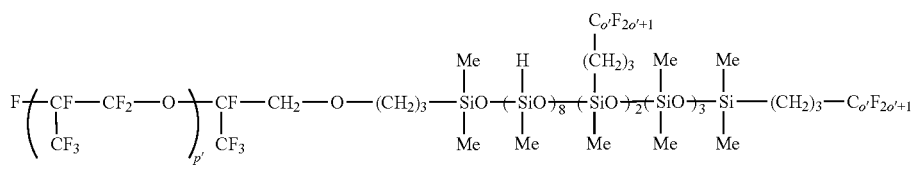
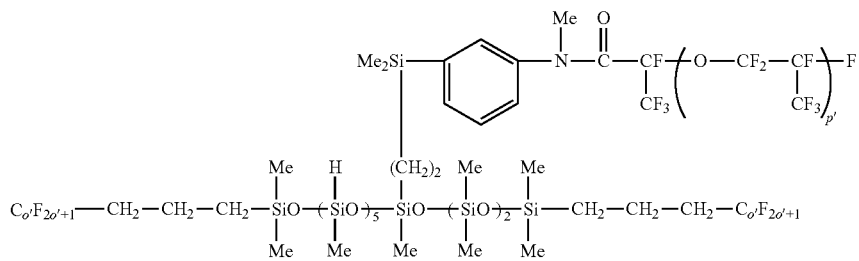
Herein o' is an integer of 1 to 10 and p' is an integer of 1 to 50.
[Chem. 25]
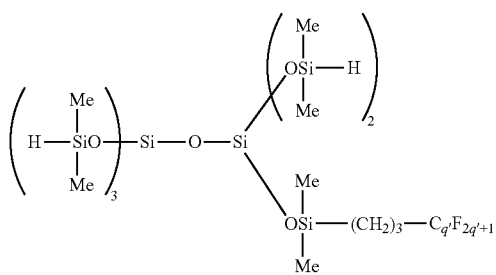
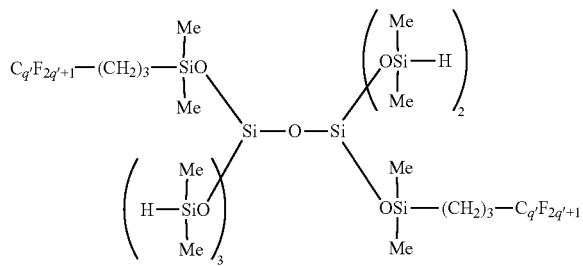

-continued
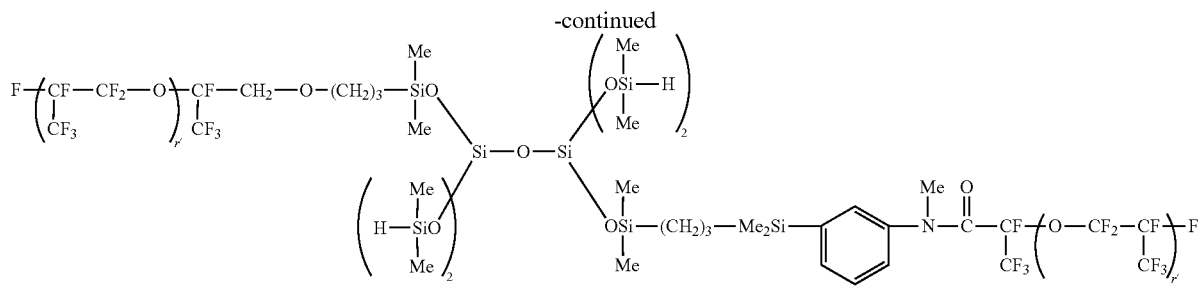
Herein q' is an integer of 1 to 10 and r' is an integer of 1 to 50.
[Chem. 26]
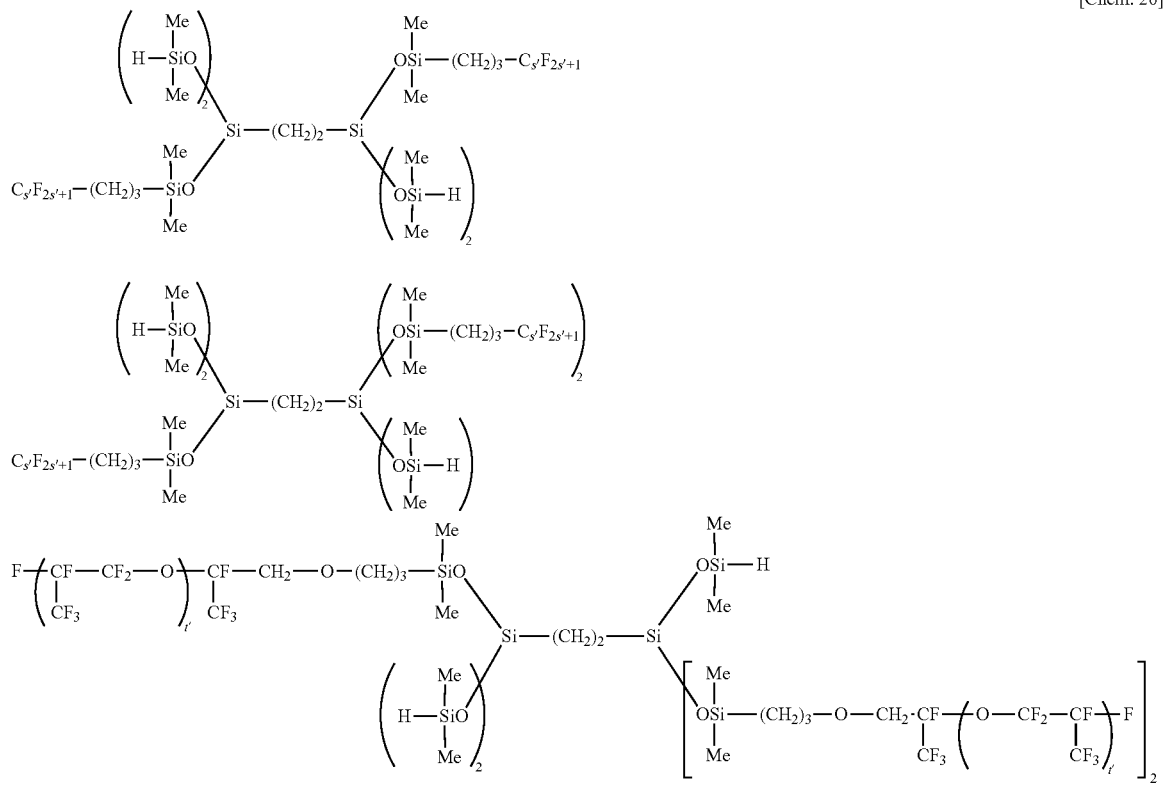
Herein s' is an integer of 1 to 10 and t' is an integer of 1 to 50.
[Chem. 27]
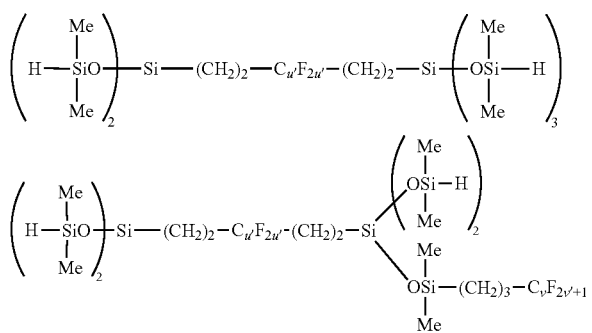

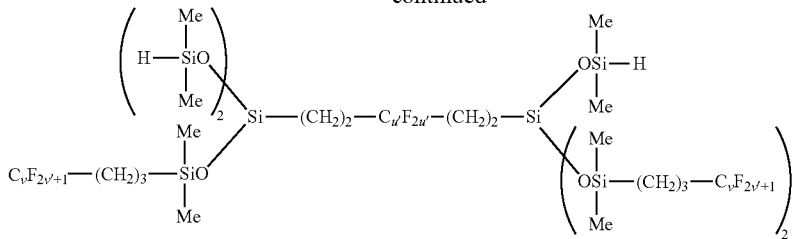
Herein u' is an integer of 1 to 20 and v' is an integer of 1 to 10.
[Chem. 28]
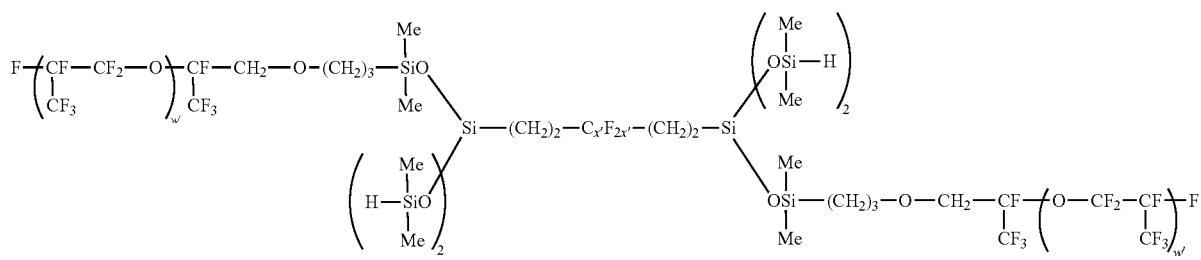
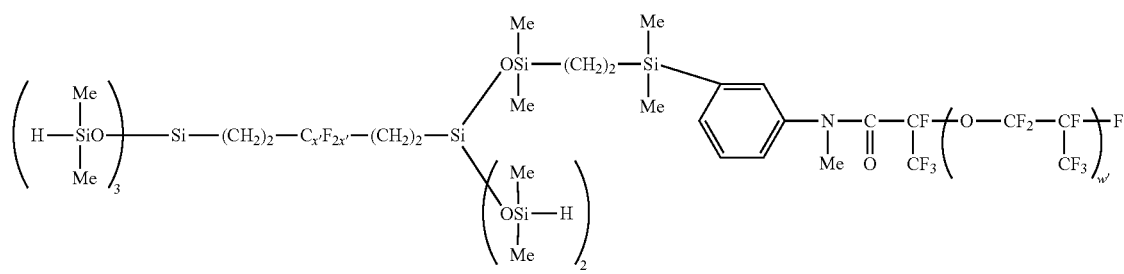
Herein w' is an integer of 1 to 50 and x' is an integer of 1 to 20.
[Chem. 29]
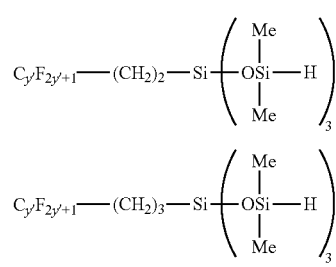
-continued
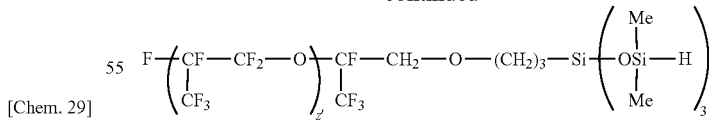
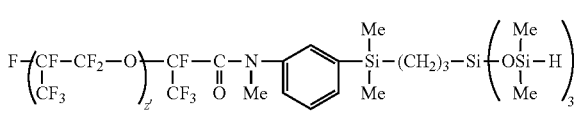
Herein y' is an integer of 1 to 10 and z' is an integer of 1 to 50.

[Chem. 30]

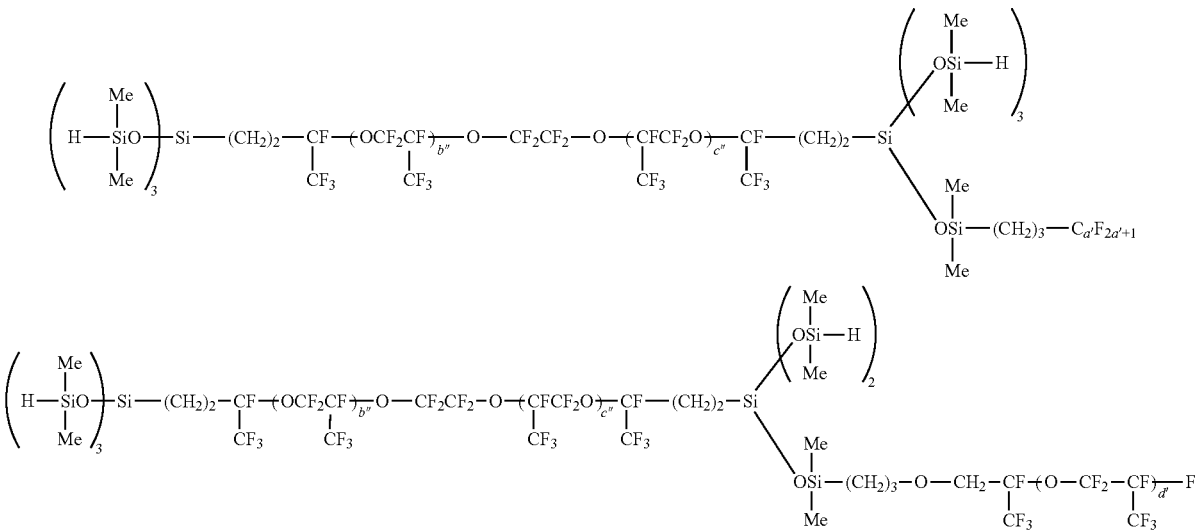

Herein a" is an integer of 1 to 10, b" and c" each are an integer of 1 to 100, b"+c" is an integer of 2 to 200, and d" is an integer of 1 to 50.

[Chem. 31]

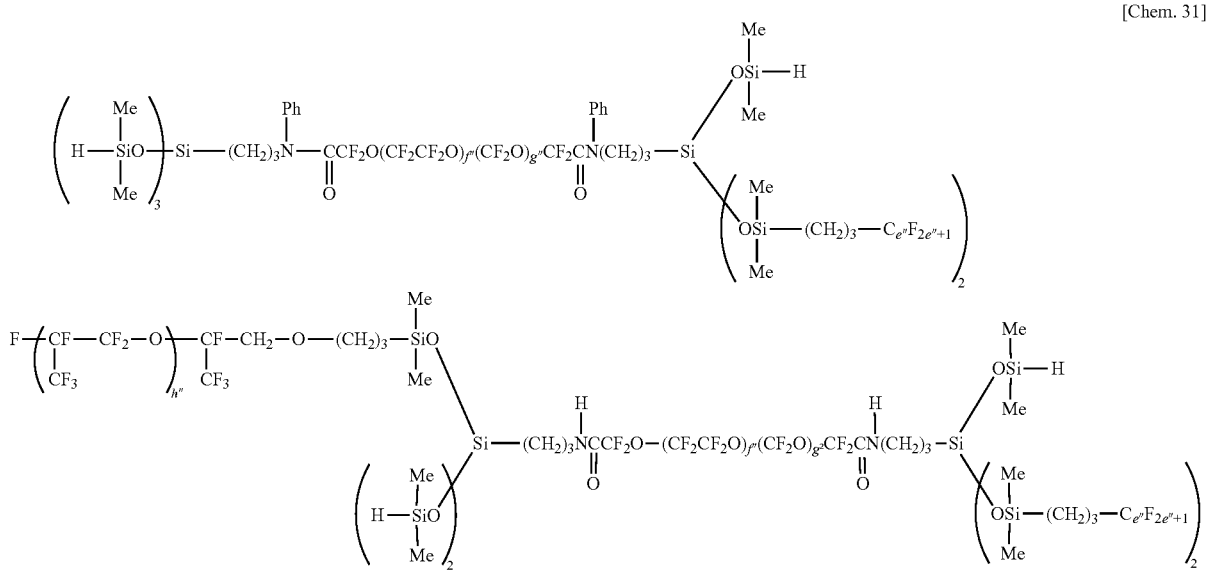

Herein e" is an integer of 1 to 10, f" and g" each are an integer of 1 to 50, f"+g" is an integer of 2 to 100, and h" is an integer of 1 to 50.

These compounds as component (B) may be used alone or in admixture of two or more.

The amount of component (B) blended is such an amount (or molar ratio) as to give 0.2 to 3 moles, preferably 0.3 to 2 moles of silicon-bonded hydrogen atoms (SiH groups) in component (B) per mole of alkenyl groups in component (A). If the SiH group is less than 0.2 mole, the cured rubber product obtained after cure is insufficient in strength. If the SiH group is more than 3 moles, shelf stability is lost or the cured rubber product obtained after cure is degraded in heat resistance.

[Component (C)]

Component (C) is sodium fluoride, which has the function of improving the rubber strength of a cured product obtained by curing the inventive rubber composition without substantial sacrifice of light transmittance.

Any commercially available one may be used as sodium fluoride. Exemplary of commercially available sodium fluoride is "Sodium Fluoride" marketed from Stellachemifa Corp.

The amount of component (C) blended is 0.10 to 100 parts by weight, preferably 1.0 to 50.0 parts by weight per 100 parts by weight of component (A). An amount of less than 0.10 part by weight fails to fully improve rubber strength whereas an amount of more than 100 parts by weight can detract from the flow of the inventive composition.

[Component (D)]

Component (D) is a platinum group metal-based catalyst which is a hydrosilylation reaction catalyst. The hydrosilylation reaction catalyst is to promote addition reaction between alkenyl groups in the composition, especially alkenyl groups in component (A) and SiH groups in the composition, especially SiH groups in component (B). The hydrosilylation reaction catalysts are generally noble metals and compounds thereof.

Since they are expensive, use is often made of platinum or platinum compounds which are relatively readily available.

Examples of the platinum compound include chloroplatinic acid, complexes of chloroplatinic acid with olefins such as ethylene, complexes of platinum with alcohols or vinylsiloxanes, and metallic platinum on silica, alumina and carbon carriers. Examples of the platinum group metal-based catalyst other than the platinum or platinum compounds include rhodium, ruthenium, iridium, and palladium based compounds, e.g., $RhCl(PPh_3)_3$, $RhCl(CO)(PPh_3)_2$, $Ru_3(CO)_{12}$, $IrCl(CO)(PPh_3)_2$, and $Pd(PPh_3)_4$. In the formulae, Ph is phenyl.

Hydrosilylation reaction catalysts of photo-activation type are also useful as component (D) or platinum group metal-based catalyst. The hydrosilylation reaction catalyst of photo-activation type is activated upon exposure to light, especially ultraviolet radiation of 300 to 400 nm to promote addition reaction between alkenyl groups in component (A) and SiH groups in component (B). Platinum group metal complex compounds are preferred because they are relatively readily available and develop satisfactory catalytic activity.

Examples of the platinum group metal complex compound of photo-activation type include (η5-cyclopentadienyl)tri(σ-alkyl) platinum complex compounds and β-diketonato platinum complex compounds, for example, trimethyl(methylcyclopentadienyl)platinum(IV), trimethyl(cyclopentadienyl)platinum(IV), trimethyl(1,2,3,4,5-pentamethylcyclopentadienyl)platinum(IV), dimethylethyl(cyclopentadienyl)platinum(IV), dimethylacetyl(cyclopentadienyl)platinum(IV), trimethyl(trimethylsilylcyclopentadienyl)platinum(IV), trimethyl(methoxycarbonylcyclopentadienyl)platinum(IV), (dimethylphenylsilylcyclopentadienyl)trimethylcyclopentadienylplatinum(IV), trimethyl(acetylacetonato)platinum(IV), trimethyl(3,5-heptadionato)platinum(IV), trimethyl(methylacetoacetato)platinum(IV), bis(2,4-pentanedionato)platinum(II), bis(2,4-hexanedionato)platinum(II), bis(2,4-heptanedionato)platinum(II), bis(3,5-heptanedionato)platinum(II), bis(1-phenyl-1,3-butanedionato)platinum(II), bis(1,3-diphenyl-1,3-propanedionato)platinum(II), and bis(hexafluoroacetylacetonato)platinum(II).

On use of these catalysts, the catalyst which is solid may be used in solid state. For obtaining a more uniform cured product, it is preferred to use a solution of chloroplatinic acid or complex in a suitable solvent such as toluene or ethanol, which is compatible with the linear polyfluoro compound as component (A).

The amount of component (D) used is an effective amount as the hydrosilylation reaction catalyst and generally such an amount as to give 0.1 to 2,000 ppm, preferably 0.1 to 500 ppm, more preferably 0.5 to 200 ppm of platinum group metal atom based on the weight of component (A). The amount may be suitably adjusted in accordance with the desired cure rate.

[Other Components]

In addition to components (A) to (D), various additives may be added to the curable fluoropolyether-based rubber composition as optional components in order to increase its usefulness, for example, hydrosilylation addition reaction inhibitors (component (E)), inorganic fillers, plasticizers, viscosity modifiers, flexibilizers, and tackifiers, e.g., organopolysiloxanes having hydrosilyl groups (SiH groups) and epoxy and/or trialkoxysilyl groups and organosiloxanes having cyclic carboxylic anhydride residues, if necessary. The amounts of these additives are arbitrary insofar as the objects of the invention are not impaired.

Examples of the hydrosilylation addition reaction inhibitor as component (E) include acetylene alcohols such as 1-ethynyl-1-hydroxycyclohexane, 3-methyl-1-butyn-3-ol, 3,5-dimethyl-1-hexyn-3-ol, 3-methyl-1-penten-3-ol, and phenylbutynol, the reaction products of chlorosilanes having a monovalent perfluoroakyl group of the above general formula (4) or a monovalent perfluorooxyalkyl group of the above general formula (5) with acetylene alcohols, 3-methyl-3-penten-1-yne, 3,5-dimethyl-3-hexen-1-yne, triallyl isocyanurate, polyvinylsiloxane, and organophosphorus compounds. The addition of component (E) keeps appropriate cure reaction and shelf stability.

Examples of the inorganic filler include silica-based reinforcing fillers, for example, silica powder such as fumed silica (dry silica), precipitated silica (wet silica), spherical silica (fused silica), sol-gel silica, or silica aerogel, surface-treated silica powder in which the foregoing silica particles are surface treated with organochlorosilanes, organodisilazanes, or cyclic organopolysilazanes, retreated silica powder in which the foregoing surface-treated silica powder is retreated with organosilanes or organosiloxanes having a monovalent perfluoroakyl group of the above general formula (4) or a monovalent perfluorooxyalkyl group of the above general formula (5); reinforcing or semi-reinforcing fillers such as to quartz powder, fused quartz powder, diatomaceous earth, and calcium carbonate; inorganic pigments such as titanium oxide, iron oxide, carbon black, cobalt aluminate; heat resistance improvers such as titanium oxide, iron oxide, carbon black, cerium oxide, cerium hydroxide, zinc carbonate, magnesium carbonate, manganese carbonate; heat conductive agents such as alumina, boron nitride, silicon carbide and metal powders; and electro-conductive agents such as carbon black, silver powder and electro-conductive zinc oxide.

As the plasticizer, viscosity modifier, and flexibilizer, linear polyfluoro compounds having the general formulae (16) and (17) and/or polyfluoromonoalkenyl compounds having the general formula (18) are useful.

$$F-(CF_2CF_2CF_2O)_{i''}-T \qquad (16)$$

Herein, T is a group of $C_{j''}F_{2j''+1-}$ wherein j" is an integer of 1 to 3, and i" is an integer of 1 to 500, preferably 2 to 30.

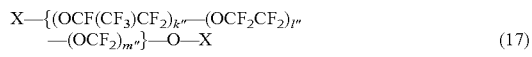

$$X-\{(OCF(CF_3)CF_2)_{k''}-(OCF_2CF_2)_{l''}-(OCF_2)_{m''}\}-O-X \qquad (17)$$

Herein, X is the same as T, k" and l" each are an integer of 0 to 300, preferably 0 to 150, excluding the case wherein both k" and l" are equal to 0, m" is an integer of 1 to 300, preferably 1 to 150, and individual repeating units may be randomly arranged.

$$Rf-(Y)_{n''}-CH=CH_2 \qquad (18)$$

Herein, Rf is a group having the general formula (19):

wherein o" is an integer of 1 to 200, preferably 1 to 150, and p" is an integer of 1 to 3, Y is —CH$_2$—, —OCH$_2$—, —CH$_2$OCH$_2$— or —CO—NR$^{13}$—Z— (each of these groups is attached to Rf at the left end and to the carbon atom at the right end), R$^{13}$ is hydrogen, methyl, phenyl or allyl, Z is —CH$_2$—, a group having the structural formula (20):

[Chem. 32]

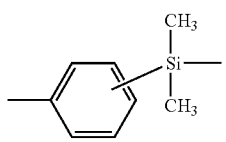

i.e., dimethylphenylsilylene group inclusive of o-, m- or p-position, which is attached to the nitrogen atom at the left and to the carbon atom at the right end, or a group having the structural formula (21):

[Chem. 33]

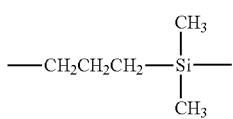

which is attached to the nitrogen atom at the left and to the carbon atom at the right end, and n" is 0 or 1.

Examples of the linear polyfluoro compounds having the general formulae (16) and (17) include the following compounds:

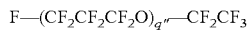

wherein q" is an integer of 1 to 200,

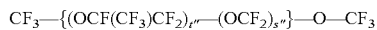

wherein r" is an integer of 1 to 200, s" is an integer of 1 to 200, and individual repeating units may be randomly arranged, and

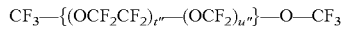

wherein t" is an integer of 1 to 200, u" is an integer of 1 to 200, and individual repeating units may be randomly arranged.

The linear polyfluoro compounds having the general formulae (16) and (17) may be used alone or in admixture of two or more.

Examples of the polyfluoromonoalkenyl compound having the general formula (18) include the following compounds.

[Chem. 34]

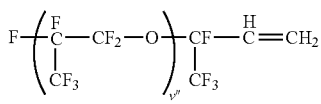

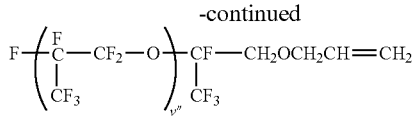

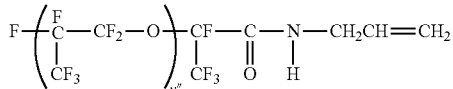

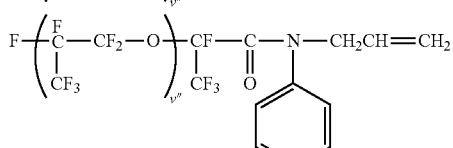

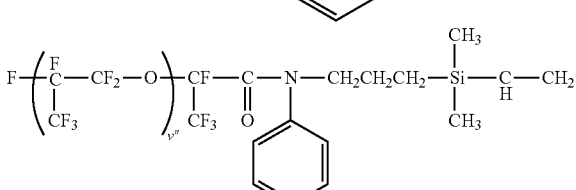

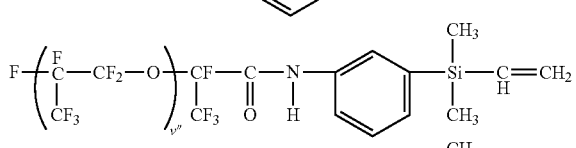

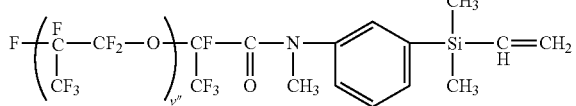

Herein v" is an integer of 1 to 200.

The polyfluoromonoalkenyl compound having the general formula (18) may be used alone or in admixture of two or more.

<Method of Preparing Curable Fluoropolyether-Based Rubber Composition>

The method of preparing the inventive rubber composition is not particularly limited. The composition may be prepared by mixing components (A) to (D) and if desired, component (E) and other optional components. At this point, any of mixing units such as a planetary mixer, Ross mixer and Hobart mixer, and kneading units such as a kneader and three-roll mill may be used as desired.

With respect to the construction of the inventive rubber composition, it may be constructed as one-part type composition wherein all components (A) to (E) and optional components are handled as one, or two-part type composition wherein two parts are mixed on use.

On use of the inventive rubber composition, depending on its application or purpose, it may be dissolved in a suitable fluorochemical solvent, for example, 1,3-bis(trifluoromethyl)benzene, Fluorinert (3M), perfluorobutyl methyl ether or perfluorobutyl ethyl ether at a desired concentration, prior to use. Particularly in the thin-film coating application, the use of a solvent is preferred.

<Method of Curing Curable Fluoropolyether-Based Rubber Composition>

The inventive rubber composition is cured into a cured rubber product which has a total transmittance of at least 80% at a thickness of 2 mm. If the total transmittance is less than 80%, the cured product can encounter troubles of optical function when used as an optical part. The total light transmittance is measured according to JIS K7361-1.

The inventive rubber composition is readily cured while allowing it to stand at normal temperature or by heating. Preferably, the composition is thermally cured at room temperature (e.g., 5 to 35° C.) to 200° C. for 1 minute to 24 hours. When a hydrosilylation reaction catalyst of photo-activation type is used as component (D) or platinum group metal-based catalyst, the light to be irradiated has such an emission spectrum that the maximum peak wavelength falls in the region of 300 to 400 nm, and a wavelength in a wavelength region shorter than 300 nm has an irradiance which is up to 5%, preferably up to 1%, more preferably up to 0.1% of the irradiance of the maximum peak wavelength, i.e., is preferably close to 0. If the light of wavelength which falls in the wavelength region shorter than 300 nm and has an irradiance of greater than 5% of the irradiance of the maximum peak wavelength is irradiated, there is a possibility that no satisfactory cured rubber product is obtained as a result of the polymer terminal groups being decomposed or the catalyst being decomposed in part.

Furthermore, the type of actinic ray to be irradiated is preferably ultraviolet (UV) though not critical. It is desirable for achieving satisfactory cure that the UV illumination dose (or illuminance) is 100 to 100,000 mJ/cm$^2$, preferably 1,000 to 10,000 mJ/cm$^2$, more preferably 5,000 to 10,000 mJ/cm$^2$, calculated as an accumulated light quantity. If the UV illumination dose (or illuminance) is less than 100 mJ/cm$^2$, there is a possibility that a sufficient energy to activate the hydrosilylation reaction catalyst of photo-activation type in the rubber composition is not available, failing to obtain an acceptable cured product. If the UV illumination dose (or illuminance) exceeds 100,000 mJ/cm$^2$, there is a possibility that more energy than necessary is irradiated to the rubber composition so that component (A) is decomposed or the catalyst is deactivated in part, failing to obtain an acceptable cured rubber product.

The UV illumination may be either light having a plurality of emission spectra or light having a single emission spectrum. The single emission spectrum may be a broad spectrum in the region of 300 to 400 nm. The light having a single emission spectrum is light having a peak (i.e., maximum peak wavelength) in the range of 300 to 400 nm, preferably 350 to 380 nm. The light source for emitting such light includes UV-emitting semiconductor chip light sources such as UV-emitting diodes (UV-LEDs) and UV-emitting semiconductor lasers.

Examples of the light source for irradiating light having a plurality of emission spectra include lamps such as metal halide lamps, xenon lamps, carbon arc lamps, chemical lamps, sodium lamps, low-pressure mercury lamps, high-pressure mercury lamps, and ultrahigh-pressure mercury lamps, and gas lasers such as nitrogen and other gas lasers, liquid lasers based on organic dye solution, and solid lasers based on rare earth ion-doped inorganic single crystals.

Where the light has an emission spectrum having a peak in a wavelength region shorter than 300 nm, or where a wavelength having an irradiance of greater than 5% of the irradiance of the maximum peak wavelength in the emission spectrum is included in a wavelength region shorter than 300 nm (for example, the emission spectrum is broad over the wide-area wavelength region), light of wavelength in the wavelength region shorter than 300 nm is removed by an optical filter. This filtering ensures that the irradiance of a wavelength in the wavelength region shorter than 300 nm is up to 5%, preferably up to 1%, more preferably up to 0.1%, most preferably 0% of the irradiance of the maximum peak wavelength. It is noted that where the emission spectrum includes a plurality of peaks in the wavelength region of 300 to 400 nm, the peak wavelength exhibiting the maximum absorbance is the maximum peak wavelength. The optical filter is not particularly limited as long as it cuts off light of wavelength shorter than 300 nm. Thus any well-known filter, for example, 365-nm bandpass filter may be used. Notably, the irradiance and spectral distribution of UV can be measured by a spectral radiometer, for example, USR-45D (Ushio Group).

The light irradiation apparatus is not particularly limited, and any desired apparatus such as spot irradiation apparatus, surface irradiation apparatus, line irradiation apparatus and conveyor irradiation apparatus are useful.

<Optical Parts>

Since the cured product obtained by curing the rubber composition of the invention is improved in heat resistance, oil resistance, chemical resistance, solvent resistance, low-temperature properties, low moisture permeability, and has satisfactory light transmittance and improved rubber strength, it is suited as the material for optical parts. The rubber composition is useful, for example, as optical materials for use in light guiding plates, backlight, liquid crystal displays, color filters and display substrates of EL display units, surface protective film, light diffusion film, phase shift film, transparent electroconductive film, antireflection film, OHP film, optical disks, optical fibers, and lenses; encapsulants for protecting electric and electronic parts including photo-semiconductor chips such as rectifier diodes, light-emitting diodes, LSI, and organic EL; and surface layer material of fixing members for use in an imaging device having a light reflecting sensor mounted thereon.

EXAMPLES

Examples and Comparative Examples are given below for illustrating the invention, but the invention is not limited thereto. In the following Examples, parts are by weight, and Me stands for methyl. The viscosity of component (A) is a measurement at 23° C. according to JIS K6249.

Examples 1 to 4 and Comparative Examples 1 to 4

Components (A) to (E) used in Examples and Comparative Examples are shown below. In the following Examples, Me stands for methyl.
Component (A)
(A-1): linear polyfluoro compound of the following formula (22) having a viscosity of 4,010 mPa·s and a vinyl content of 0.0301 mol/100 g

[Chem. 35]

(22)

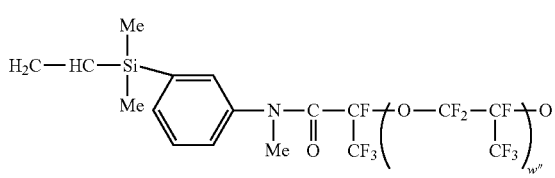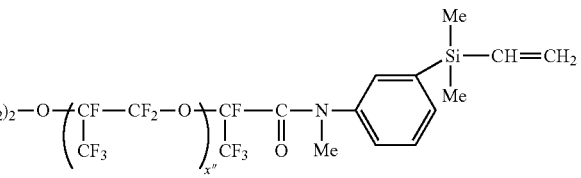

Herein w" and x" each are an integer of at least 1, and an average value of w"+x" is 35.

(A-2): linear polyfluoro compound of the following formula (23) having a viscosity of 11,000 mPa·s and a vinyl content of 0.0119 mol/100 g

[Chem. 36]

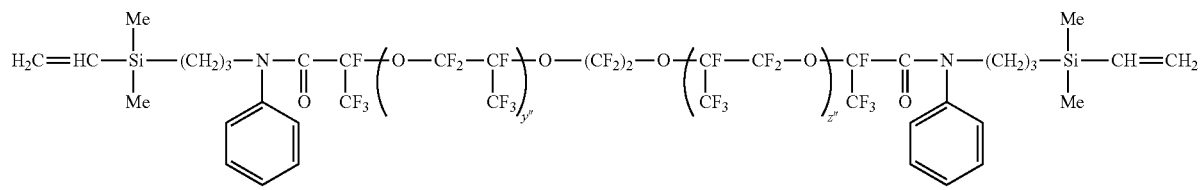

(23)

Herein y" and z" each are an integer of at least 1, and an average value of y"+z" is 90.

Component (B)

(B-1): fluorinated organohydrogensiloxane of the following formula (24) having a SiH content of 0.00394 mol/g

[Chem. 37]

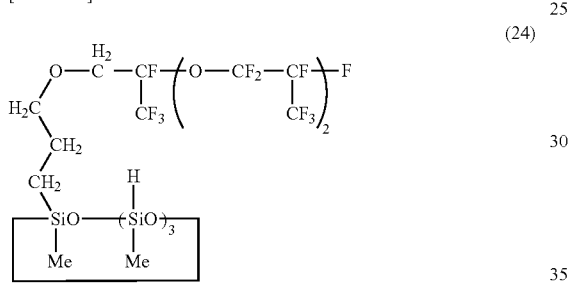

(24)

(B-2): fluorinated organohydrogensiloxane of the following formula (25) having a SiH content of 0.000967 mol/g

[Chem. 38]

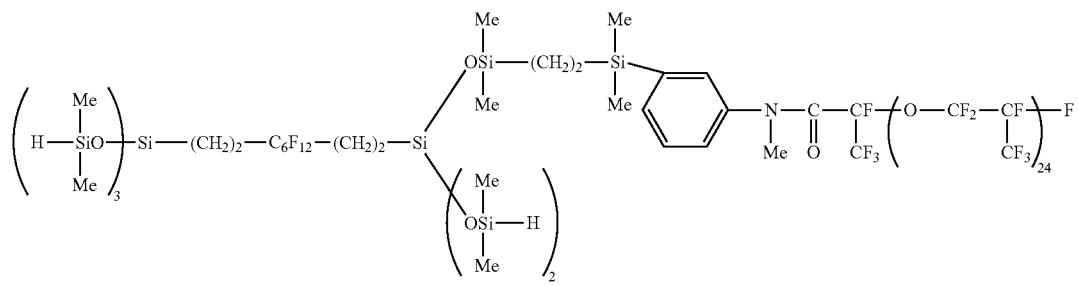

(25)

Component (C)
(C-1): Sodium Fluoride by Stellachemifa Corp.
Component (D)
(D-1): toluene solution of platinum-divinyltetramethyldisiloxane complex (Pt concentration 0.5 wt %)
Component (E)
(E-1): 50 wt % toluene solution of 1-ethynyl-1-hydroxycyclohexane Using the foregoing components in the amounts shown in Table 1, compositions of Examples 1 to 4 and Comparative Examples 1 to 4 were prepared as follows. The compositions were molded and cured into cured products and the cured products were measured for rubber properties and total transmittance, according to the following procedures. The results are shown in Table 1.

Preparation of Compositions of Examples 1 to 4

First, component (A) and (C) in the predetermined amounts in Table 1 were kneaded on a planetary mixer at room temperature for 1 hour, and further kneaded under a reduced pressure of −98.0 kPaG at 150° C. for 1 hour. Once the kneaded mass was cooled to room temperature, it was milled on a three-roll mill. The predetermined amount in Table 1 of component (D) was added to the milled mass, which was milled at room temperature for 10 minutes. The predetermined amount in Table 1 of component (E) was added to the milled mass, which was milled at room temperature for 10 minutes. Finally, the predetermined amount in Table 1 of component (B) was added to the milled mass, which was milled at room temperature for 10 minutes, yielding a composition.

Preparation of Compositions of Comparative Examples 1 to 3

First, component (A) and (D) in the predetermined amounts in Table 1 were kneaded on a planetary mixer at room temperature for 10 minutes. Next, the predetermined amount in Table 1 of component (E) was added to the milled mass, which was milled at room temperature for 10 minutes. Finally, the predetermined amount in Table 1 of component (B) was added to the milled mass, which was milled at room temperature for 10 minutes, yielding a composition.

Preparation of Composition of Comparative Example 4

First, component (A) and spherical silica particles (Admafine SO-32R/75C by Admatechs Co., Ltd., average particle size 1.6 μm) in the predetermined amounts in Table 1 were kneaded on a planetary mixer at room temperature for 1 hour, and further kneaded under a reduced pressure of −98.0 kPaG at 150° C. for 1 hour. Once the kneaded mass was cooled to room temperature, it was milled on a three-roll mill. The predetermined amount in Table 1 of component (D) was added to the milled mass, which was milled at room temperature for 10 minutes. The predetermined amount in Table 1 of component (E) was added to the milled mass, which was milled at room temperature for 10 minutes. Finally, the predetermined amount in Table 1 of component (B) was added to the milled mass, which was milled at room temperature for 10 minutes, yielding a composition.

Preparation of Cured Products of Examples 1 to 4 and Comparative Examples 1 to 4

The compositions were press crosslinked (primary crosslinking) at 150° C. for 10 minutes and oven crosslinked (secondary crosslinking) at 150° C. for 50 minutes into cured sheets of 85 mm by 105 mm by 2 mm.

Rubber Properties of Cured Products of Examples 1 to 4 and Comparative Examples 1 to 4

The cured sheets were measured for hardness according to JIS K6253-3 and for tensile strength and elongation at break according to JIS K6251. The results are shown in Table 1.

Total Transmittance of Cured Products of Examples 1 to 4 and Comparative Examples 1 to 4

The cured sheets were measured for total light transmittance by a haze meter HGM-2 (Suga Test Instruments Co., Ltd.) according to JIS K7361-1. The results are shown in Table 1.

TABLE 1

| Components (pbw) | | Example | | | | Comparative Example | | | |
|---|---|---|---|---|---|---|---|---|---|
| | | 1 | 2 | 3 | 4 | 1 | 2 | 3 | 4 |
| (A) | (A-1) | 100 | — | 100 | 100 | 100 | — | 100 | — |
| | (A-2) | — | 100 | — | — | — | 100 | — | 100 |
| (B) | (B-1) | 8.40 | — | — | — | 8.40 | — | — | — |
| | (B-2) | — | 13.5 | 37.4 | 37.4 | — | 13.5 | 37.4 | 13.5 |
| (C) | (C-1) | 25 | 50 | 75 | 100 | — | — | — | — |
| (D) | (D-1) | 0.20 | 0.20 | 0.20 | 0.20 | 0.20 | 0.20 | 0.20 | 0.20 |
| (E) | (E-1) | 0.20 | 0.20 | 0.20 | 0.20 | 0.20 | 0.20 | 0.20 | 0.20 |
| Spherical silica | | — | — | — | — | — | — | — | 30 |
| Molar ratio of SiH groups in (B)/vinyl groups in (A) | | 1.1 | 1.1 | 1.2 | 1.2 | 1.1 | 1.1 | 1.2 | 1.1 |
| Hardness (Durometer Type A) | | 40 | 38 | 44 | 51 | 33 | 27 | 31 | 47 |
| Tensile strength (MPa) | | 1.0 | 1.0 | 1.1 | 1.3 | 0.5 | 0.4 | 0.3 | 1.2 |
| Elongation at break (%) | | 120 | 130 | 100 | 120 | 80 | 80 | 50 | 120 |
| Total transmittance (%) | | 91 | 90 | 87 | 82 | 94 | 95 | 96 | 53 |

The cured products obtained by curing the compositions of Examples 1 to 4 meeting the requirements of claim 1 are higher in hardness, tensile strength and elongation at break than the cured products obtained by curing the compositions of Comparative Examples 1 to 3 devoid of component (C), while their total transmittance is not substantially reduced and is higher than 80%. The cured product obtained by curing the composition of Comparative Example 4 is high in hardness, tensile strength and elongation at break, but shows a markedly low value of total transmittance due to spherical silica particles blended therein.

The above results demonstrate that the composition of the invention gives a cured product having satisfactory light transmittance and improved rubber strength and is useful especially as the material for optical parts.

The invention claimed is:

1. A curable fluoropolyether-based rubber composition comprising:
   (A) a linear polyfluoro compound containing at least two alkenyl groups per molecule and having a perfluoropolyether structure in its main chain,
   (B) a fluorine-containing organohydrogensiloxane having a monovalent perfluoroalkyl or monovalent perfluorooxyalkyl group or a divalent perfluoroalkylene or divalent perfluorooxyalkylene group and containing at least two silicon-bonded hydrogen atoms (or SiH groups), per molecule, in an amount to give 0.2 to 3 moles of SiH groups in component (B) per mole of alkenyl groups in component (A),
   (C) sodium fluoride in an amount of 0.10 to 100 parts by weight per 100 parts by weight of component (A), and
   (D) a platinum group metal-based catalyst in an amount to give 0.1 to 2,000 ppm of platinum group metal atom based on the weight of component (A).

2. The curable fluoropolyether-based rubber composition of claim 1 wherein the linear polyfluoro compound as component (A) has an alkenyl content of 0.005 to 0.3 mol/100 g.

3. The curable fluoropolyether-based rubber composition of claim 1 wherein the perfluoropolyether structure in component (A) contains a structure having the formula (1):

wherein a is an integer of 1 to 6 and b is an integer of 1 to 300.

4. The curable fluoropolyether-based rubber composition of claim 1 wherein component (A) is a linear polyfluoro compound having the formula (2):

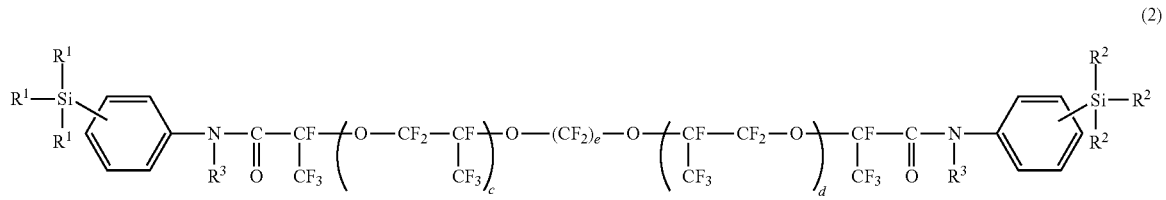

wherein $R^1$ and $R^2$ each are an alkenyl group or an unsubstituted or substituted monovalent hydrocarbon group free of aliphatic unsaturation, $R^1$ is independent each other, $R^2$ is independent each other, at least two of the total six $R^1$ and $R^2$ are alkenyl groups, $R^3$ is each independently hydrogen or an unsubstituted or substituted monovalent hydrocarbon group, c and d each are an integer of 1 to 150, an average value of c+d is 2 to 300, and e is an integer of 1 to 6, and/or a linear polyfluoro compound having the formula (3):

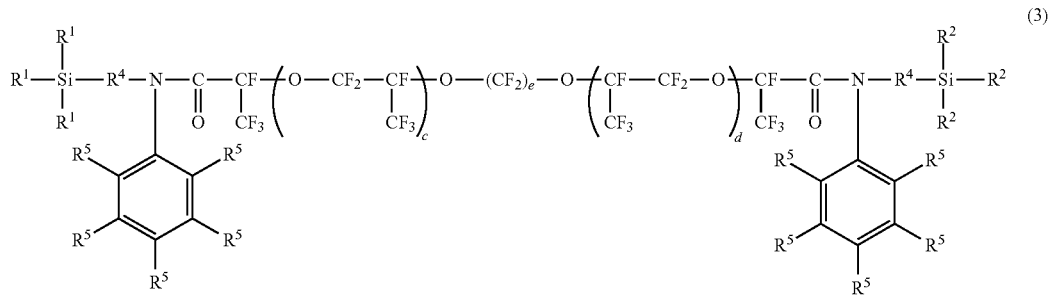

wherein $R^1$ and $R^2$ each are an alkenyl group or an unsubstituted or substituted monovalent hydrocarbon group free of aliphatic unsaturation, $R^1$ is independent each other, $R^2$ is independent each other, at least two of the total six $R^1$ and $R^2$ are alkenyl groups, $R^4$ is each independently a $C_1$-$C_6$ alkylene group, $R^5$ is each independently hydrogen or a $C_1$-$C_4$ alkyl group which may be substituted with fluorine, c and d each are an integer of 1 to 150, an average value of c+d is 2 to 300, and e is an integer of 1 to 6.

5. The curable fluoropolyether-based rubber composition of claim 1 which provides a cured rubber product having a total transmittance of at least 80% as measured at thickness 2 mm according to JIS K7361-1.

6. An optical part comprising a cured product layer of the curable fluoropolyether-based rubber composition of claim 1.

* * * * *